(12) United States Patent
Nishihara et al.

(10) Patent No.: US 8,059,431 B2
(45) Date of Patent: Nov. 15, 2011

(54) SWITCHING POWER SUPPLY

(75) Inventors: Hideki Nishihara, Ehime (JP); Akeyuki Komatsu, Ehime (JP)

(73) Assignee: Panasonic Corporation, Osaka (JP)

( * ) Notice: Subject to any disclaimer, the term of this patent is extended or adjusted under 35 U.S.C. 154(b) by 210 days.

(21) Appl. No.: 12/601,134

(22) PCT Filed: May 19, 2008

(86) PCT No.: PCT/JP2008/001238
§ 371 (c)(1),
(2), (4) Date: Nov. 20, 2009

(87) PCT Pub. No.: WO2008/146463
PCT Pub. Date: Dec. 4, 2008

(65) Prior Publication Data
US 2010/0149837 A1    Jun. 17, 2010

(30) Foreign Application Priority Data
May 22, 2007    (JP) ................. 2007-134858

(51) Int. Cl.
H02M 3/335    (2006.01)
H02H 7/10    (2006.01)
(52) U.S. Cl. ............. 363/56.1; 363/21.09; 363/21.17
(58) Field of Classification Search ........ 363/16, 363/20, 21.01, 21.04, 21.09, 21.12, 21.17, 363/55, 56.01, 56.09, 56.1, 97
See application file for complete search history.

(56) References Cited

U.S. PATENT DOCUMENTS

| 4,903,183 | A  | * | 2/1990  | Noguchi et al. ........ 363/21.09 |
| 5,559,500 | A  |   | 9/1996  | Kase |
| 6,316,967 | B1 | * | 11/2001 | Takagi et al. ............... 327/50 |
| 7,136,292 | B1 | * | 11/2006 | Chan et al. ............. 363/21.09 |
| 2009/0039862 | A1 | * | 2/2009 | Tonge ..................... 323/316 |

FOREIGN PATENT DOCUMENTS

| JP | 2-72678 | 6/1990 |
| JP | 7-248342 | 9/1995 |
| JP | 9-37547 | 2/1997 |
| JP | 2004-215394 | 7/2004 |
| JP | 2007-163376 | 6/2007 |

* cited by examiner

*Primary Examiner* — Gary L Laxton
(74) *Attorney, Agent, or Firm* — Hamre, Schumann, Mueller & Larson. P.C.

(57) ABSTRACT

An object of the present invention is to provide a switching power supply which can stably determine whether an overcurrent occurs or not on the secondary side. A sample voltage corresponding to a load current value detected by detection resistors R7 and R8 is compared with a reference voltage by an input-side transistor Q4 and an output-side transistor Q3 which compose a first current mirror circuit 14, so that it is possible to determine whether an overcurrent occurs or not. Moreover, a current passing through the output circuit of the transistor Q3 is temperature-compensated by a second current mirror circuit 17 made up of transistors Q6 and Q5.

3 Claims, 8 Drawing Sheets

US 8,059,431 B2

SWITCHING POWER SUPPLY

TECHNICAL FIELD

The present invention relates to a switching power supply which outputs the secondary-side voltage of a voltage conversion section after rectifying and smoothing the voltage and controls switching on the primary side of the voltage conversion section according to a detected load current to perform overcurrent protection.

BACKGROUND ART

In a power supply, an overcurrent protection circuit is provided for limiting a load current to protect the power supply and a load from an overload. Generally, overcurrent protection is broadly divided into three methods shown in FIGS. 8(a), 8(b) and 8(c).

In FIG. 8(a), when an output current exceeds the set upper limit, an output voltage decreases and the output current is reduced to provide protection. This method is called Foldback Type Drooping Characteristic based on the pattern of the correlation characteristic of the output voltage and the output current.

In FIG. 8(b), when an output current exceeds the set upper limit, the output current is immediately reduced to provide protection. This method is called "pendent character" based on the pattern of the correlation characteristic of an output voltage and the output current.

In FIG. 8(c), when an output current exceeds the set upper limit, the output current is reduced at a constant power to provide protection. This method is called an inverted V-shaped characteristic based on the pattern of the correlation characteristic of an output voltage and the output current.

In the case of a switching power supply for detection for overcurrent protection only on the primary side of a transformer, an overcurrent protection set value is deviated by a change of an input voltage, resulting in low accuracy.

In the case of the overcurrent protection characteristic of FIG. 8(c), it is possible to protect a switching transistor on the primary side of a transformer but a current increases in a diode for rectification on the secondary side of the transformer even under protection, which is disadvantageous to overcurrent protection (described in Patent Document 1 and so on).

As compared to FIG. 8(c), when a load current is detected on the secondary side of a transformer T1 as shown in FIG. 6, satisfactory overcurrent protection can be expected.

In FIG. 6, to a primary winding 11 of the transformer T1, an input DC voltage V1 is applied through a switching transistor Q1 acting as a series control element. The frequency of a pulse signal Psw applied to the base of the switching transistor Q1 is controlled by a control circuit 13.

The output of a secondary winding 12 of the transformer T1 is half-wave rectified by a diode D2 and the output is smoothed by a capacitor C3 to obtain an output voltage Vo. A load current i1 is detected by a detection resistor R7 disposed in a secondary-side circuit.

An error amplifier Z2 for supplying information to the control circuit 13 according to a detected voltage of the detection resistor R7 is configured as follows:

A current mirror circuit 14 is made up of an input-side transistor Q4 and an output-side transistor Q3. Between a reference potential G and the base of the transistor Q4 whose base and collector are connected to each other, a voltage source B1 is connected via a resistor R6. The emitter of the transistor Q4 is connected to the detection resistor R7 on the side of the reference potential G.

The base of the transistor Q3 is connected to the base of the transistor Q4 and the collector of the transistor Q3 is connected to the junction point of the resistor R6 and the voltage source B1 via a resistor R4. The emitter of the transistor Q3 is connected to a junction point 15 of the detection resistor R7 and the secondary winding 12 via a resistor R3.

A junction point 16 of the collector of the transistor Q3 and the resistor R4 is connected to the base of an output transistor Q2 via a resistor R2. The emitter and collector of the transistor Q2 are interposed between one end of a resistor R1 having the other end connected to the control circuit 13 and the reference potential G.

In the error amplifier Z2 configured thus, the resistor R4 for determining a reference voltage is connected to the collector of the transistor Q3 and the amplification degree of the error amplifier Z2 is determined by a ratio between the resistance values of the resistors R3 and R4.

When the load current i1 increases, a voltage drop across the detection resistor R7 increases, the voltage of the junction point 16 of the resistor R7 and the resistor R3 decreases, and the collector current of the transistor Q3 increases. Accordingly, a potential decreases on the junction point 15 of the collector of the transistor Q3, the base current of the output transistor Q2 increases, and the load current i1 increases to a set value. At this point, the resistor R1 connected to the control circuit 13 is connected to the reference potential G via the output transistor Q2 and the switching frequency of the primary side is controlled to achieve overcurrent protection of "Fold-back Type Drooping Characteristic" shown in FIG. 8(a).

Patent Document 1: Japanese Patent Laid-Open No. 2004-215394

DISCLOSURE OF THE INVENTION

Problems to be Solved by the Invention

In the circuit configuration of FIG. 6, however, the amplification degree of the error amplifier Z2 is changed by a temperature change (temperature characteristic) of the resistor R4, so that the reference voltage may be changed and the set value of overcurrent protection may be deviated.

A current passing through the transistor Q3 is larger than a current passing through the transistor Q4. When a current passing through i1 increases, a voltage difference across the detection resistor R7 increases. When the load current i1 increases and a current difference increases between the value of current passing through the transistor Q3 and the value of current passing through the input-side transistor Q4, a temperature difference occurs between the transistor Q3 and the transistor Q4. In other words, the set value of overcurrent protection may vary between the absence of a temperature difference between the transistor Q3 and the input-side transistor Q4 in, for example, a cold state immediately after turn-on and the presence of a large temperature difference between the transistor Q3 and the transistor Q4 after aging.

An object of the present invention is to provide a switching power supply which can stably judge the occurrence of overcurrent on the secondary side of a voltage conversion section.

Means for Solving the Problems

A switching power supply according to a first aspect of the present invention for outputting the secondary-side voltage of a voltage conversion section after rectifying and smoothing the voltage, and controlling switching on the primary side of the voltage conversion section according to a detected load current to perform overcurrent protection, the switching power supply including: a detection resistor for detecting a load current on the secondary side of the voltage conversion section; a first current mirror circuit made up of a first transistor of an input side and a second transistor of an output side; and a second current mirror circuit made up of a third transistor of the input side and a fourth transistor of the output side, wherein the detected voltage of the detection resistor is applied between one end of the first transistor and one end of the second transistor, the fourth transistor fed with a current set by the third transistor is interposed between the second transistor and a reference potential, and switching on the primary side of the voltage conversion section is controlled according to the potential of the junction point of the second transistor and the fourth transistor to perform overcurrent protection.

A switching power supply according to a second aspect of the present invention, in the first aspect, wherein the junction point of the second transistor and the fourth transistor and the base of the second transistor are connected via a resistor.

A switching power supply according to a third aspect of the present invention, in one of the first and second aspects, wherein a circuit for rectifying and smoothing the secondary-side voltage of the voltage conversion section is a half-wave voltage doubling rectifier circuit in which a first diode has an anode connected to one end of the output of the voltage conversion section, the first diode has a cathode connected to the anode of a second diode, the junction point of the first diode and the second diode is connected to the other end of the output of the voltage conversion section via a capacitor, and an output voltage from the cathode of the second diode and the one end of the output of the voltage conversion section is smoothed as an output voltage, the detection resistor for detecting the load current on the secondary side of the voltage conversion section is made up of a first detection resistor interposed between the one end of the output of the voltage conversion section and the anode of the first diode, and a second detection resistor interposed between the first detection resistor and the anode of the first diode, and a voltage across the first detection resistor and the second detection resistor which are connected in series is applied between the one end of the first transistor and the one end of the second transistor.

Advantage of the Invention

According to the present invention, a second current mirror circuit is provided to perform temperature compensation on a first current mirror circuit, achieving a stable overcurrent protection operation.

BEST MODE FOR CARRYING OUT THE INVENTION

Referring to FIGS. 1 to 5, embodiments of the present invention will be described below.

First Embodiment

Figure 1:
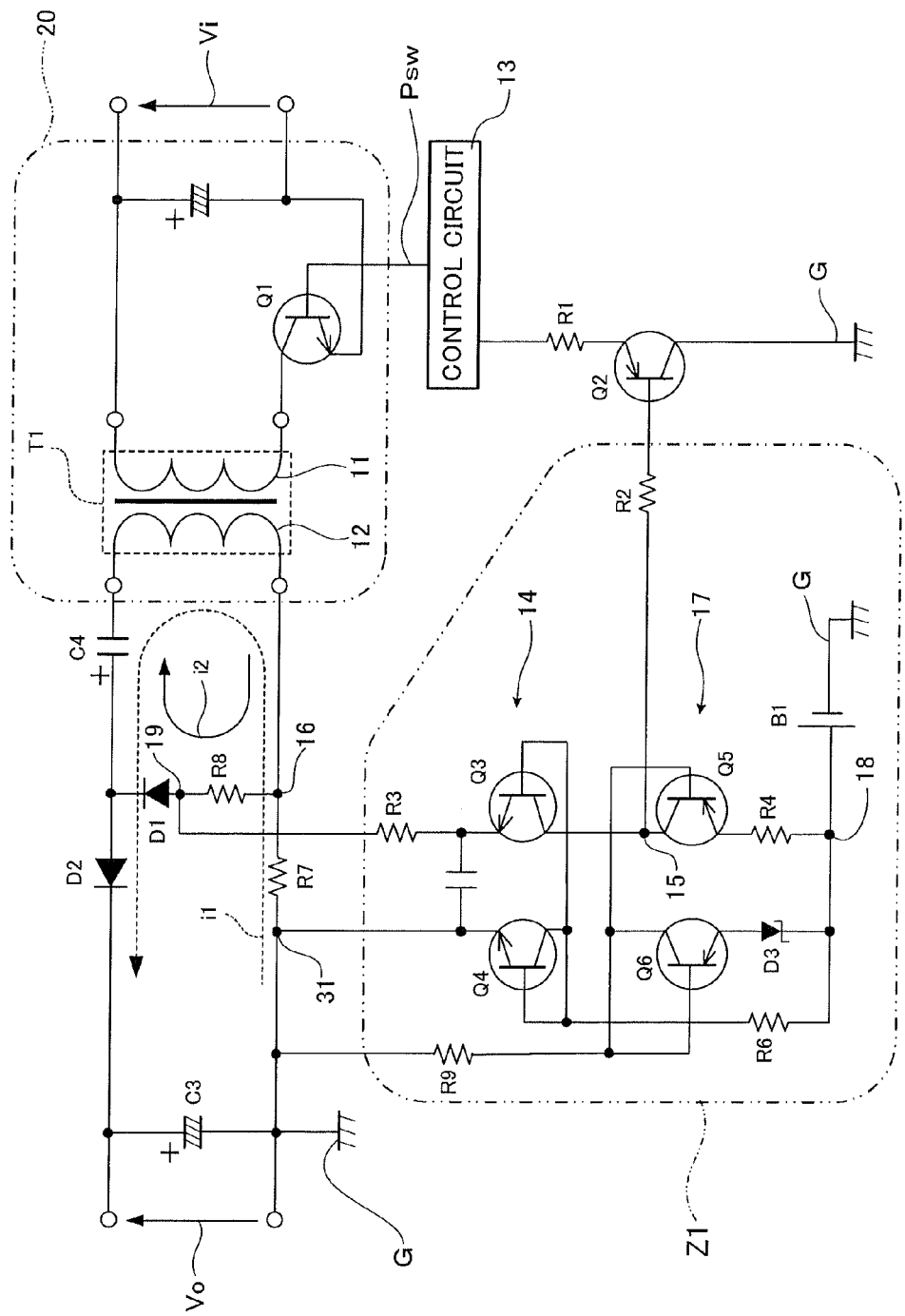
FIG. 1 is a structural diagram showing a switching power supply according to a first embodiment of the present invention.
Figure 6:
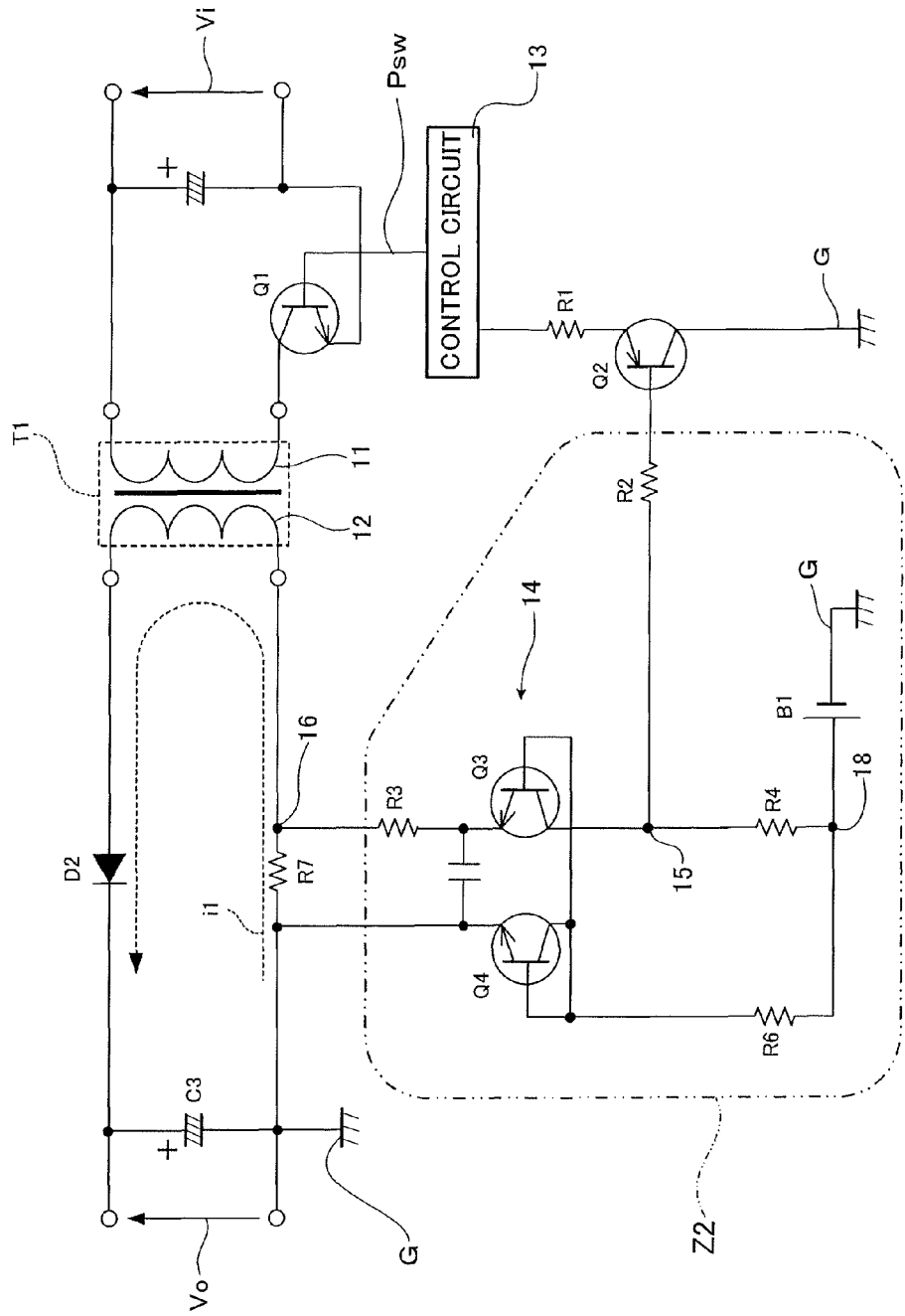
FIG. 6 is a structural diagram showing a switching power supply of the prior art.

FIG. 1 shows a switching power supply in which a voltage conversion section 20 is made up of a transformer T1 and the output voltage of a secondary winding 12 of the transformer T1 is subjected to half-wave voltage doubling rectification by a diode D1, a diode D2, and a capacitor C4. As compared with the switching power supply of half-wave rectification shown in FIG. 6, a current mirror circuit 17 made up of a transistor Q6 and a transistor Q5 is provided in addition to the diode D1, a detection resistor R8, and the capacitor C4.

To be specific, to a primary winding 11 of the transformer T1, an input DC voltage V1 is applied through a switching transistor Q1 acting as a series control element. The frequency of a pulse signal Psw applied to the base of the switching transistor Q1 is controlled by a control circuit 13.

The output of the secondary winding 12 of the transformer T1 is subjected to voltage doubling rectification by the diodes D1 and D2 and the capacitor C4, the output is smoothed by a capacitor C3, and an output DC voltage Vo is outputted.

A half-cycle current i2 for charging the capacitor C4 through the diode D1 by an output voltage E of the secondary wiring 12 of the transformer T1 is detected by the detection resistor R8 connected in series with the diode D1. In the subsequent half cycle, a load current it for charging the capacitor C3 through the diode D2 by the output voltage E of the secondary winding 12 of the transformer T1 and the terminal voltage of the capacitor C4 is passed, so that an output DC voltage Vo of 2·E is generated across the capacitor C3. The load current i1 is detected by a detection resistor R7.

The capacitor C3 has one end connected to a reference potential G and the secondary winding 12 of the transformer T1 has one end connected to the reference potential G via the detection resistor R7. The detection resistor R8 having one end connected to the anode of the diode D1 has the other end connected to a junction point 16 of the detection resistor R7 and one end of the secondary winding 12.

An error amplifier Z1 for supplying information to the control circuit 13 according to the detected voltages of the detection resistors R7 and R8 is configured as follows:

A first current mirror circuit 14 is made up of an NPN transistor Q4 and an NPN transistor Q3. The base and collector of the transistor Q4 are connected to each other and are connected to the reference potential G via a resistor R6 and a voltage source B1. The emitter of the transistor Q4 is connected to the reference potential.

The base of the transistor Q3 is connected to the base of the transistor Q4 and the collector of the transistor Q3 is connected to a junction point 18 of the resistor R6 and the voltage source B1 via the second current mirror circuit 17.

The second current mirror circuit 17 is made up of the PNP transistor Q6 and the PNP transistor Q5. The base and collector of the transistor Q6 are connected to each other and are connected to the reference potential G via a resistor R9. The emitter of the transistor Q6 is connected to the junction point 18 of the resistor R6 and the voltage source B1 via a constant voltage diode D3. The base of the transistor Q5 is connected to the base of the transistor Q6, the collector of the transistor Q5 is connected to the collector of the transistor Q3, and the emitter of the transistor Q5 is connected to the junction point 18 of the resistor R6 and the voltage source B1 via a resistor R4.

A junction point 15 of the collector of the transistor Q3 and the collector of the transistor Q5 is connected to the base of an output transistor Q2 via a resistor R2. The emitter and collector of the transistor Q2 are interposed between one end of a resistor R1 having the other end connected to the control circuit 13 and the reference potential G.

The emitter of the transistor Q3 is connected to a junction point 19 of the anode of the diode D1 and the detection resistor R8 via a resistor R3.

With this configuration, the collector current of the transistor Q5 is expressed as follows:

$$(Vz+Q6Vbe-Q5Vbe)/r4$$

where Vz is the Zener voltage of the constant voltage diode D3, "Q6Vbe" is a voltage between the base and emitter of the transistor Q6, "Q5Vbe" is a voltage between the base and emitter of the transistor Q5, and "r4" is the resistance value of the resistor R4. It is possible to obtain a constant current not affecting a temperature change, achieving a stable overcurrent protection operation.

Further, in addition to the detection resistor R7, the terminal voltage of the series circuit of the detection resistor R7 and the detection resistor R8 is used as the sample signal of the error amplifier Z1. An overcurrent can be detected not only from one cycle but from both cycles, of the load current i1 and the load current i2, so that the control circuit 13 can be controlled with higher accuracy.

Figure 7:
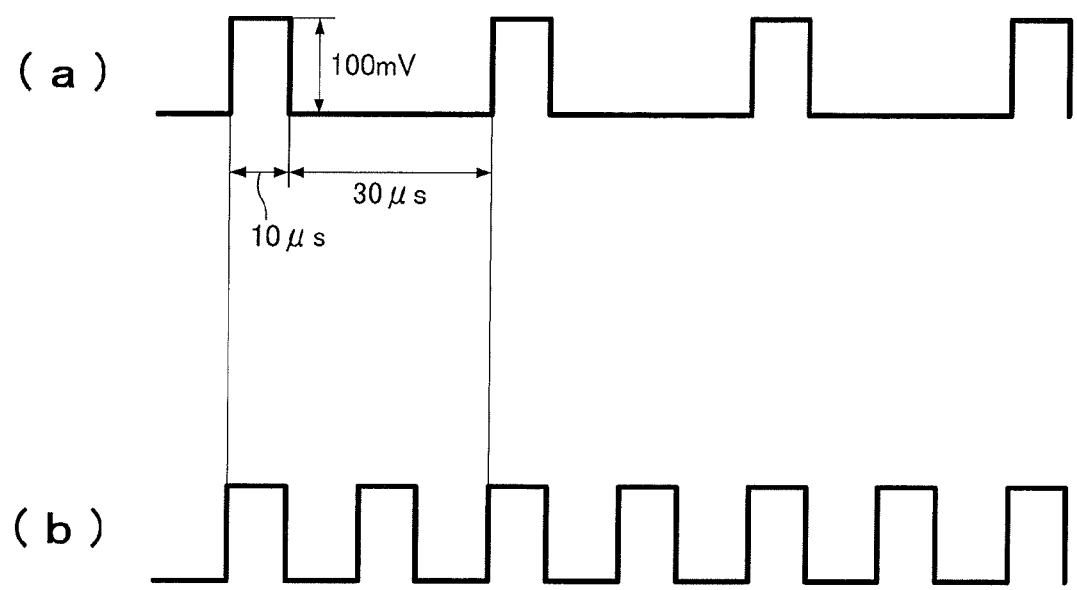
FIG. 7 is a detected waveform chart of the main parts of the third embodiment and the first embodiment according to the present invention.
Figure 8A:
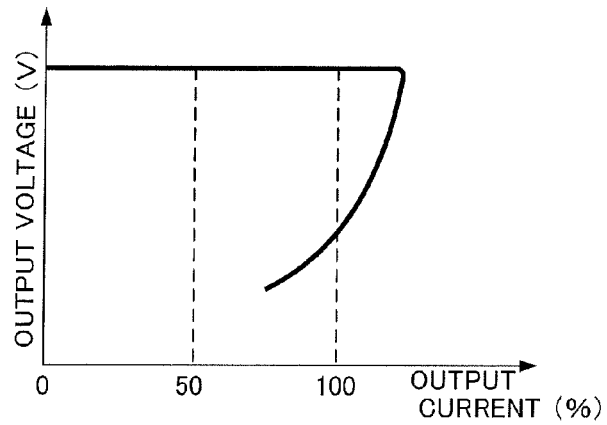
FIG. 8 is an explanatory drawing showing a typical overcurrent protection method.
Figure 8B:
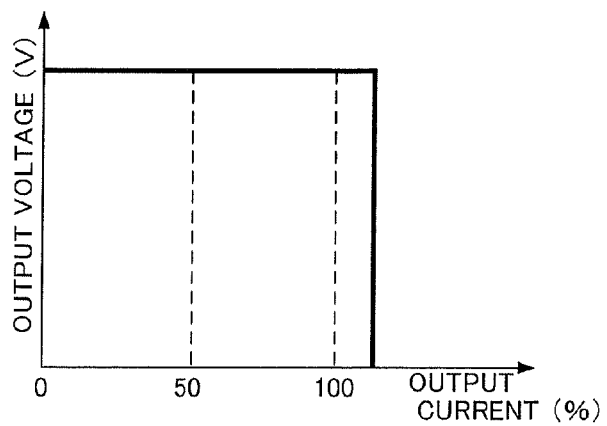
Figure 8C:
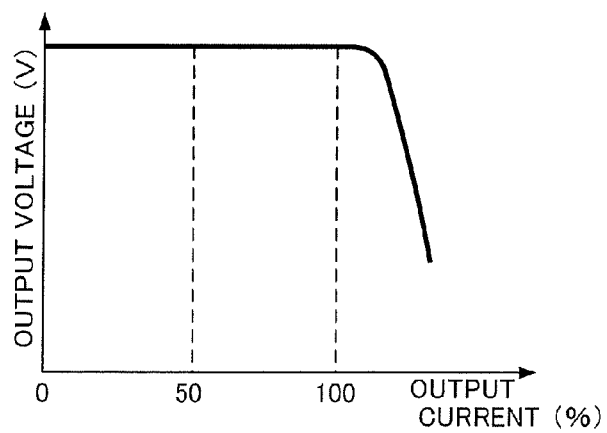

FIG. 7 shows specific examples when the single detection resistor is used and the two detection resistors are used. In this case, an operation is performed with an input of a 24 V DC voltage and an output of 240 V DC voltage and 2.5 A.

Figure 3:
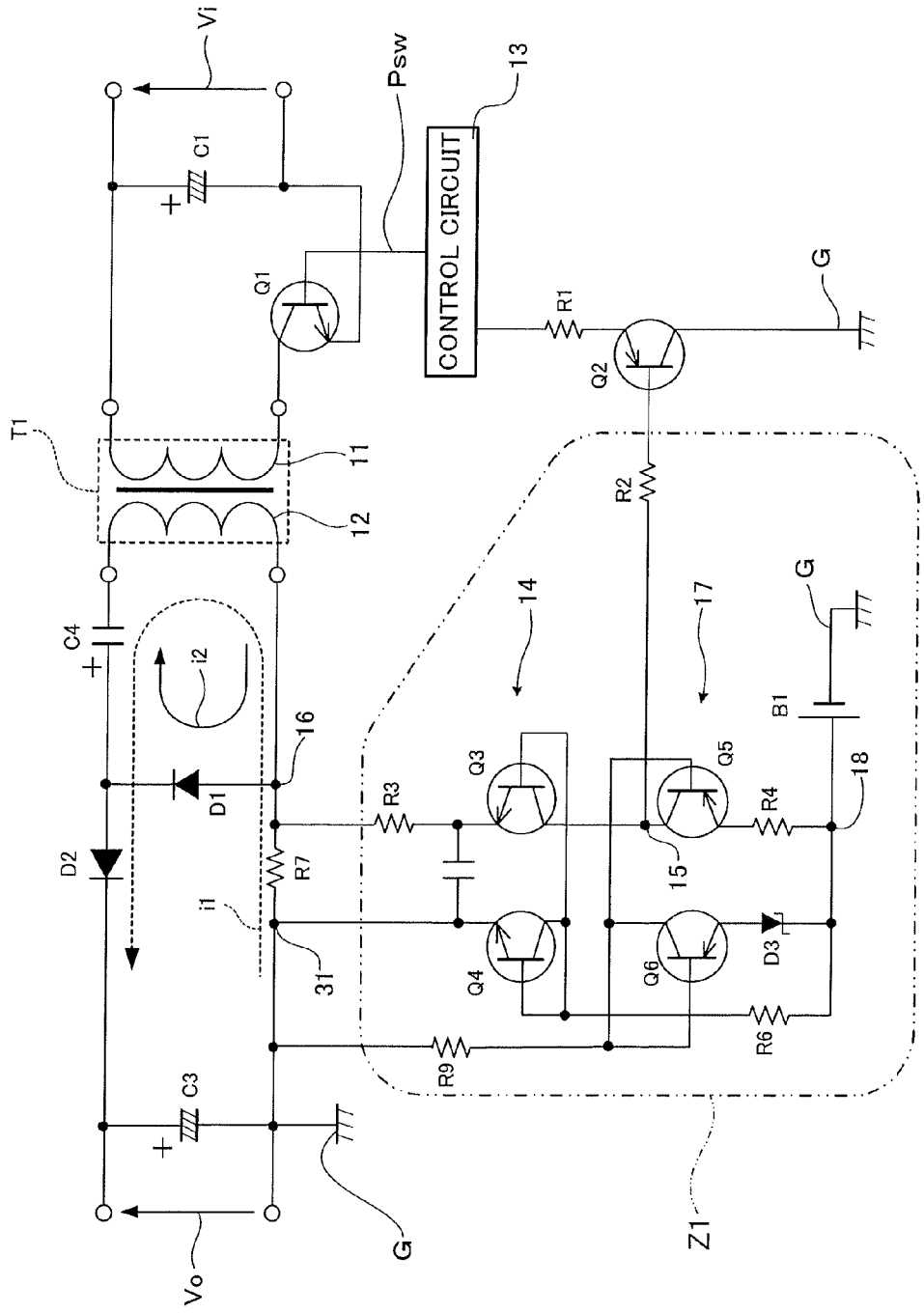
FIG. 3 is a structural diagram showing a switching power supply according to a third embodiment of the present invention.

FIG. 7(a) shows a detected voltage waveform when only the detection resistor R7 is used as shown in FIG. 3. The voltage waveform is obtained between a junction point 31 of the detection resistor R7 and the reference potential G and the junction point 16 of the detection resistor R7 and the secondary side of the transformer T1.

FIG. 7(b) shows a detected voltage waveform when the detection resistor R7 and the detection resistor R8 are used as shown in FIG. 1. The voltage waveform is obtained between the junction point 31 of the detection resistor R7 and the reference potential G and the junction point 19 of the detection resistor R8 and the diode D1.

When the terminal voltage of the series circuit of the detection resistor R7 and the detection resistor R8 is used thus as the sample signal of the error amplifier Z1, an overcurrent is detected from both cycles of the load current i1 and the load current i2. Thus the control circuit 13 can be accurately controlled as compared with the case where only the detection resistor R7 is used.

Second Embodiment

Figure 2:
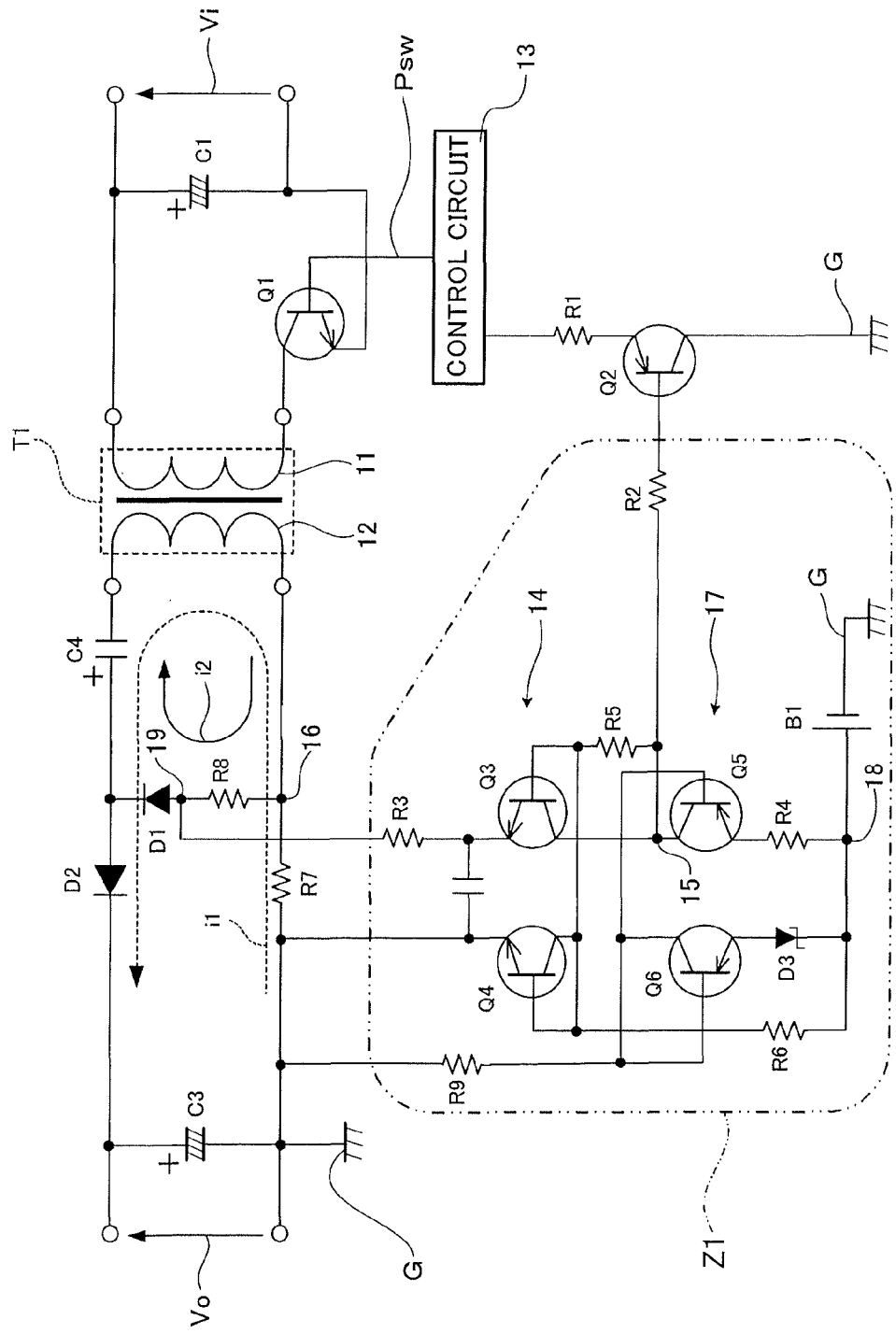
FIG. 2 is a structural diagram showing a switching power supply according to a second embodiment of the present invention.

FIG. 2 shows a second embodiment of the present invention.

FIG. 2 is different from FIG. 1 only in that the base of a transistor Q3 is connected to the collector of a transistor Q5 via a resistor R5.

In other words, the amplification degree of an error amplifier Z1 is determined by the resistor R5 and a resistor R3. Since one end of the resistor R5 has a constant current not affecting a temperature change (temperature characteristic), the bases of a transistor Q4 and the transistor Q3 which are connected to the other end of the resistor R5 have the same potential. Thus substantially the same current passes through the transistor Q3 and the transistor Q4, thereby reducing a deviation of the set value of overcurrent protection.

Third Embodiment

FIG. 3 shows a third embodiment of the present invention.

FIG. 3 shows a switching power supply using a rectification method of half-wave voltage doubling rectification as in FIG. 1 illustrating the first embodiment. FIG. 3 is different from FIG. 1 only in that the terminal voltage of a detection resistor R7 is used as the sample signal of an error amplifier Z1. In this case, a control circuit 13 is controlled by detecting an overcurrent only from one cycle. Thus it is possible to achieve a stable overcurrent protection operation not affecting a temperature change as compared with the prior art, though the performance of overcurrent protection with a varying load is not as satisfactory as the performance of the first embodiment. The overcurrent protection can be similarly performed also in FIG. 2 illustrating the second embodiment.

Fourth Embodiment

Figure 4:
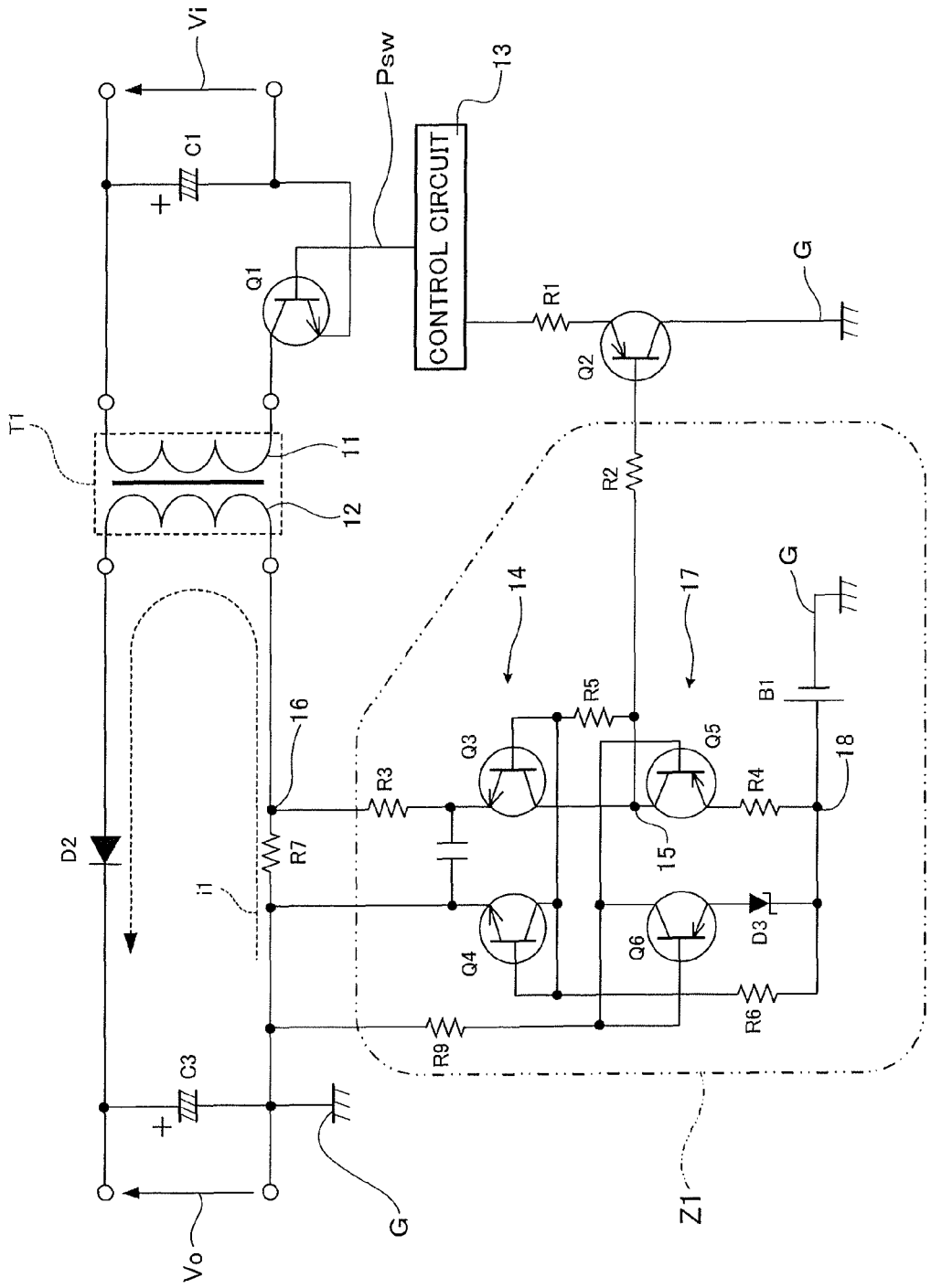
FIG. 4 is a structural diagram showing a switching power supply according to a fourth embodiment of the present invention.

FIG. 4 shows a fourth embodiment of the present invention.

FIG. 4 shows a switching power supply using a rectification method of half-wave rectification. FIG. 4 is different from FIG. 2 illustrating the second embodiment only in that the terminal voltage of a detection resistor R7 is used as the sample signal of an error amplifier Z1.

Fifth Embodiment

Figure 5:
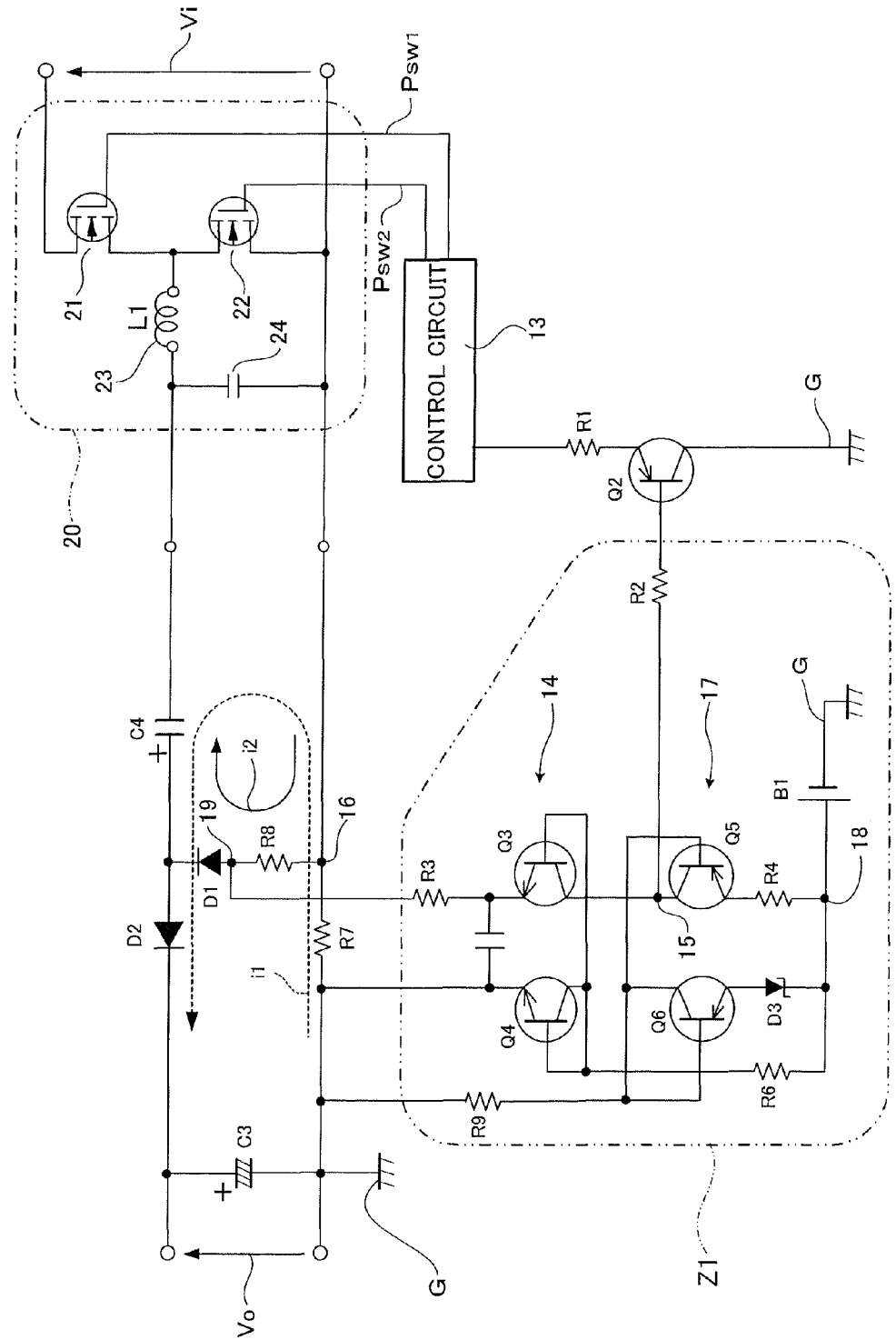
FIG. 5 is a structural diagram showing a switching power supply according to a fifth embodiment of the present invention.

FIG. 5 shows a fifth embodiment of the present invention.

In FIG. 5, a voltage conversion section 20 is made up of a DC-DC converter including MOS transistors 21 and 22, an inductor 23, and a capacitor 24. FIG. 5 is different from FIG. 1 illustrating the first embodiment only in that pulse signals Psw1 and Psw2 applied to the gates of the MOS transistors 21 and 22 from a control circuit 13 are controlled to control switching on the primary side and perform voltage conversion and overcurrent protection. The overcurrent protection can be similarly performed also in the second to fourth embodiments.

In the foregoing embodiments, the first current mirror circuit 14 is made up of the NPN transistors Q3 and Q4 of a first conductivity type and the second current mirror circuit 17 is made up of the PNP transistors Q5 and Q6 of a second conductivity type. The first current mirror circuit 14 may be made up of PNP transistors Q3 and Q4 and the second current mirror circuit 17 may be made up of NPN transistors Q5 and Q6.

INDUSTRIAL APPLICABILITY

The present invention is particularly useful as a power supply having a large load current of several tens amperes and used for equipment in which the accuracy of overcurrent protection setting is highly valued. To be specific, the present invention is assembled as a power supply for an inverter, a motor drive and the like, so that variations in judgment of overcurrent due to a temperature can be eliminated. Thus the present invention can contribute to a more reliable operation and higher safety of assembled equipment.

The invention claimed is:

1. A switch power supply for outputting a secondary-side voltage of a voltage conversion section after rectifying and smoothing the voltage, and controlling switching on a primary side of the voltage conversion section according to a detected load current to perform overcurrent protection;

the switching power supply comprising:

a detection resistor for detecting a load current on a secondary side of the voltage conversion section;

a first current mirror circuit made up of a first transistor of an input side and a second transistor of an output side; and a second current mirror circuit made up of a third transistor of the input side and a fourth transistor of the output side, wherein a detected voltage of the detection resistor is applied between one end of the first transistor and one end of the second transistor, the fourth transistor fed with a current set by the third transistor is interposed between the second transistor and a reference potential, and switching on the primary side of the voltage conversion section is controlled according to a potential of a junction point of the second transistor and the fourth transistor to perform overcurrent protection.

2. The switching power supply according to claim 1, wherein the junction point of the second transistor and the fourth transistor and a base of the second transistor are connected via a resistor.

3. The switching power supply according to claim 1, wherein a circuit for rectifying and smoothing the secondary-side voltage of the voltage conversion section is a half-wave voltage doubling rectifier circuit in which a first diode has an anode connected to one end of an output of the voltage conversion section, the first diode has a cathode connected to an anode of the second diode, a junction point of the first diode and the second diode is connected to an other end of a secondary winding of a transformer via a capacitor, and an output voltage from a cathode of the second diode and the one end of the output of the voltage conversion section is smoothed as an output voltage, the detection resistor for detecting the load current on the secondary side of the voltage conversion section is made up of:

a first detection resistor interposed between the one end of the output of the voltage conversion section and the anode of the first diode, and a second detection resistor interposed between the first detection resistor and the anode of the first diode, and a voltage across the first detection resistor and the second detection resistor which are connected in series is applied between the one end of the first transistor and the one end of the second transistor.

* * * * *